No. 797,060. PATENTED AUG. 15, 1905.
R. P. JACKSON.
CONTROLLER FOR ALTERNATING CURRENT APPARATUS.
APPLICATION FILED JAN. 23, 1905.

2 SHEETS—SHEET 1.

WITNESSES:
Fred. H. Miller
Otto S. Schauer.

INVENTOR
Ray P. Jackson
BY
Wesley G. Carr
ATTORNEY

No. 797,060. PATENTED AUG. 15, 1905.
R. P. JACKSON.
CONTROLLER FOR ALTERNATING CURRENT APPARATUS.
APPLICATION FILED JAN. 23, 1905.

2 SHEETS—SHEET 2.

WITNESSES:
Fred. H. Miller
Otto S. Schairer

INVENTOR
Ray P. Jackson
BY
Wesley G. Carr
ATTORNEY

UNITED STATES PATENT OFFICE.

RAY P. JACKSON, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROLLER FOR ALTERNATING-CURRENT APPARATUS.

No. 797,060.          Specification of Letters Patent.          Patented Aug. 15, 1905.

Application filed January 23, 1905. Serial No. 242,314.

*To all whom it may concern:*

Be it known that I, RAY P. JACKSON, a citizen of the United States, and a resident of Wilkinsburg, in the county of Allegheny and State of Pennsylvania, have invented a new and useful Improvement in Controllers for Alternating-Current Apparatus, of which the following is a specification.

My invention relates to controllers for electrical apparatus, and particularly to controllers for supplying large currents at variable voltages to translating devices that are operated by means of alternating-current energy.

My invention has for its object to provide means for preventing injurious arcing between the circuit making and breaking contact-surfaces of controllers which are employed for the above-stated purpose.

The speeds of alternating-current motors may be varied by varying the voltages applied to them, and this is commonly done by varying the active lengths of the windings of the transformers from which the motors are supplied with energy. In the operation of controllers which are employed for varying the active lengths of such transformer-windings the motor-circuits are broken at each variation step in the voltage or portions of the main transformer-windings are temporarily short-circuited, and dangerous and destructive arcs are usually produced when either of these changes takes place.

My invention provides simple means for reducing arcing to such an extent that it does not seriously affect the operation of controllers, and such means are illustrated in the accompanying drawings, in which—

Figure 1:
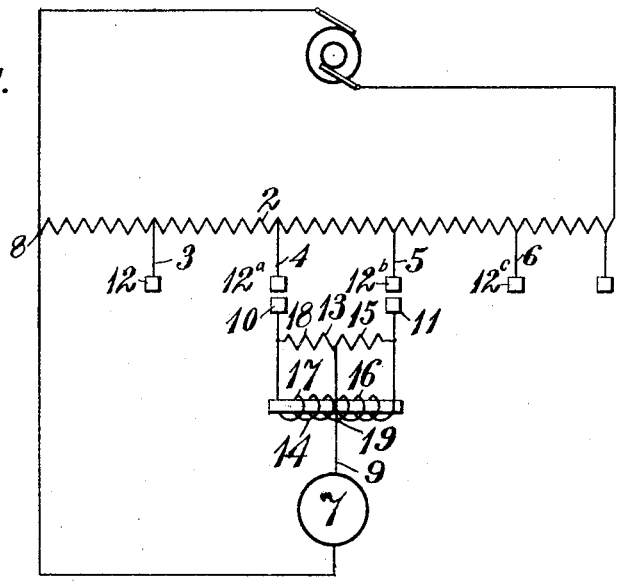
Figure 2:
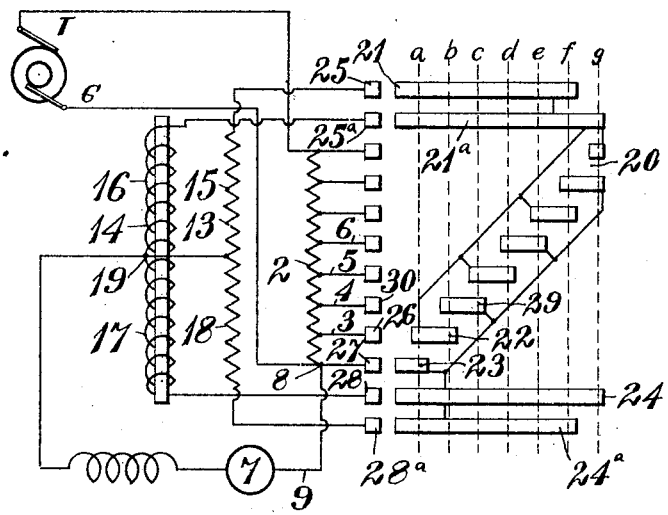
Figure 3:
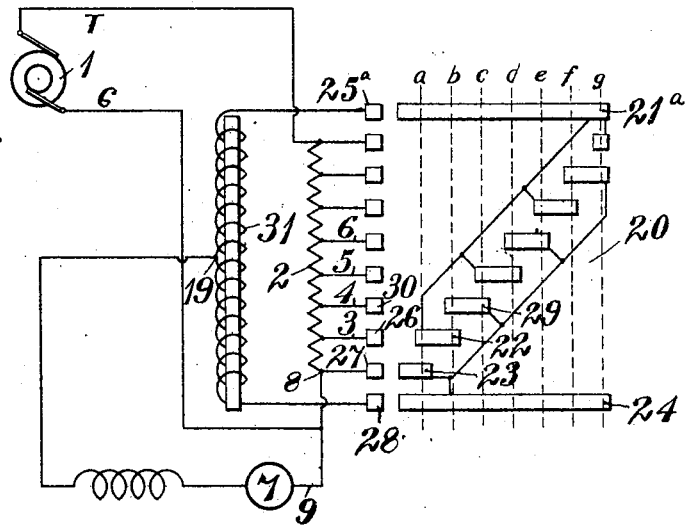
Figure 4:
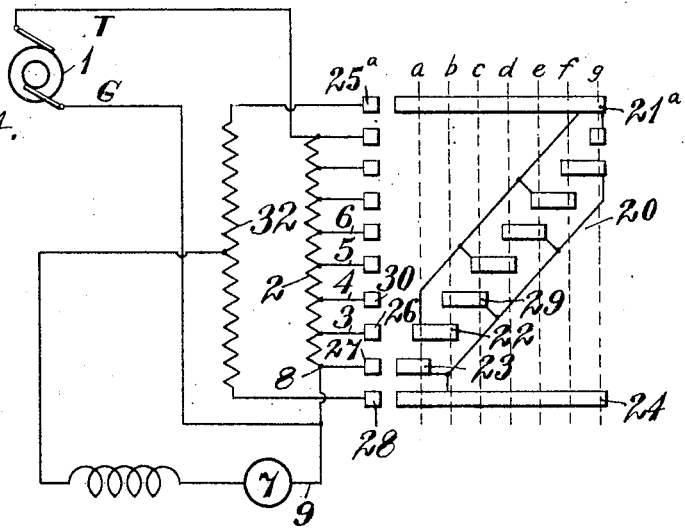

Figure 1 is a diagrammatic view of a simple system embodying the invention. Fig. 2 represents in development a controller employed in practicing my invention. Figs. 3 and 4 are views corresponding to Fig. 2, but illustrating modifications.

Alternating-current energy is supplied from a suitable source 1 to a main transformer-winding 2, which is subdivided by means of spaced leads 3 4 5 6, &c., one terminal of a motor 7 being connected to terminal 8 of said winding or to any other suitable point in that winding. The speed of the motor 7 may be varied by varying the voltage applied to its terminals, which in this case may be done by connecting terminal 9 of the motor directly and successively to the respective leads 3 4 5 6, &c.

In case the motor 7 is of large capacity, however, the arcs produced by severing a direct connection between the terminal 9 and the several leads 3 4 5 6, &c., may be of such character and proportions as to cause serious damage to the contact-surfaces and possible injury to the operator. To avoid this objection, I provide a regulating device 13, having comparatively high ohmic resistance, and an inductive regulating device 14, having very little ohmic resistance, and connect them in parallel between two contact-terminals 10 and 11, which are adapted to engage, respectively, with adjacent contact-terminals 12 $12^a$ $12^b$ $12^c$, &c., of the respective leads 3 4 5 6, &c. The middle points or any other two suitable intermediate points of the resistances 13 and 14 are connected together and to the terminal 9 of the motor 7.

If the contact-terminals 10 and 11 engage, respectively, with the corresponding contact-terminals $12^a$ and $12^b$, current is supplied to the motor 7 from the leads 4 and 5 through the portions 16 and 17 of the device 14 to the terminal 9 of the motor 7. Lead 5 being of higher potential than lead 4, the voltage impressed upon the portion 16 will be greater than that impressed upon the portion 17 of the winding 14; but these two portions are in the same magnetic circuit, and hence there is a tendency to equalize the potential differences between the middle point 19 of the device 14 and the terminals 10 and 11 because of the inductive action of portion 16 upon portion 17. The voltage impressed upon the terminals of the motor 7 is approximately equal to the difference of potential between the terminal 8 and a point in the winding 2 midway between the point of attachment thereto of the leads 4 and 5. There is a slight difference in the values of the currents in the two portions 16 and 17 of the device 14, because the portion 16 must supply the current required to magnetize the iron in the magnetic circuit.

It is evident that the portion of the main transformer-winding 2 included between the leads 4 and 5 is short-circuited when the controller is in the position just described; but the ohmic resistance device 13 is included in that circuit and the current is thereby reduced to a comparatively small value.

If it is desired to supply a higher voltage to the motor 7, the contact-terminal 10 should be moved to make contact with the contact-terminal 12$^c$. In severing connection between the contact-terminal 10 and the terminal 12$^a$ a slight sparking or arcing may occur, due to the interrupting of the local circuit; but this arcing is much less than ordinarily occurs in such apparatus, owing to the fact that the differences of potential between the contact-terminals 10 and 11 and the middle point 19 of the regulating device 14 are approximately equal and because the portions 15 and 16 of the respective devices 13 and 14 are amply able to conduct the current required by the motor 7.

After the contact-terminal 10 is disconnected from the terminal 12$^a$ current is supplied to the motor 7 through the portions 15 and 16 of the regulating devices 13 and 14 in parallel, and it has been found that the best results are obtained when the devices are so proportioned that the currents in these two portions are approximately equal. Since the portions 16 and 17 of the device 14 are in the same magnetic circuit, a voltage is induced in the portion 17 approximately equal to that impressed upon the portion 16, a closed circuit being formed by the portions 17 and 18 of the devices 14 and 13. Since these circuits or similar ones are always complete, comparatively little sparking will occur when changing the connections of the terminals 10 and 11 with the main transformer-winding whether passing from a lower to a higher or from a higher to a lower voltage connection.

Instead of moving the contact 10 from terminal 12$^a$ to terminal 12$^c$ the contact-terminal 11 might be moved to make contact with the terminal 12$^c$ and the contact-terminal 10 be moved to make contact with the terminal 12$^b$; but if this should be done it would be necessary to break the contact between the contact-terminal 10 and the terminal 12$^a$ and bring terminal 10 into engagement with the terminal 12$^b$ before breaking the corresponding contact between terminal 11 and the terminal 12$^b$ in order to secure the advantages of my invention.

In Fig. 2 I have shown in development a suitable controller for practicing my invention, the elements and connections of which are so arranged that the direction of the drop of potential through the regulating devices 13 and 14 is alternately reversed.

In position $a$ of the controller-drum 20 drum-segments 21, 21$^a$, 22, 23, 24, and 24$^a$ make contact, respectively, with fingers 25, 25$^a$, 26, 27, 28, and 28$^a$, a main circuit for the motor 7 being thus provided from the terminal 8 through the portion of the main transformer-winding 2 which is included between the terminal 8 and the lead 3, contact-finger 26, drum-segments 22, 21, and 21$^a$, contact-fingers 25 and 25$^a$, portions 15 and 16, respectively, of the ohmic and inductive resistance devices 13 and 14 and a branch circuit being provided from the terminal 8 through finger 27, contact-segments 23, 24, and 24$^a$, fingers 28 and 28$^a$, and portions 17 and 18 of resistance devices 14 and 13.

In the position $b$ of the controller-drum 20 contact is broken between the drum-segment 23 and the contact-finger 27 and drum-segment 29 and contact-finger 30 engage each other, a main circuit for the motor being thus provided from its terminal 8 through the portion of the main transformer-winding 2 included between the terminal 8 and lead 4, contact-finger 30, drum-segments 29 24, and 24$^a$, contact-fingers 28 and 28$^a$, and portions 18 and 17, respectively, of the ohmic and inductive resistance devices 13 and 14 and a branch circuit being provided from the terminal 8 through that portion of the transformer-winding 2 between it and the lead 3, finger 26, segments 22, 21, and 21$^a$, fingers 25 and 25$^a$, and portions 15 and 16 of the resistance devices 13 and 14.

For the remainder of the positions of the controller-drum the operation is similar to that just described.

It is evident from the above description that the main circuit of the motor is alternately through the portions 18 and 17 and the portions 15 and 16, respectively, of the ohmic and inductive resistance devices 13 and 14.

When the controller-drum 20 has reached its last position $g$, or that corresponding to full-speed running of the motor 7, the contact-fingers 25 and 28$^a$ become disengaged from the corresponding drum-segments 21 and 24$^a$, whereby the non-inductive resistance device 13 is cut out of circuit and the losses in the controller are reduced to a minimum.

The combination and arrangement of the regulating devices with the other parts of the controller which I have thus far described are those which have been found most effectual in preventing sparking when changing the circuit connections and in minimizing the energy losses in the controller when it occupies normal running positions. Sparking is prevented because the circuits of the motor and of the inductive regulating device are never interrupted, but are only altered when changes in the positions of the controller take place, and owing to the comparatively high ohmic resistance of the non-inductive regulating device 13 very little energy loss occurs therein, the greater portion of the current that is supplied to the motor 7 traversing the inductive regulating device 14, the ohmic resistance of which should be low. It may be found, however, in many cases that if only a single regulating device is employed of one character or the other in place of two that differ in character certain advantageous results may be secured.

In Fig. 3 I have shown a controller embodying only an inductive regulating device 31. With this modification a limited amount of sparking will occur when changing the circuit connections, owing to the interruptions of the circuit of the inductive regulating device 31, though the energy losses in the said devices may be very small if its resistance is low.

In the modification of Fig. 4 only a non-inductive regulating device 32 is employed, and as a result the energy losses in the ohmic resistance may be rather large, though not necessarily excessive, while the sparking at the controller contact-terminals may be almost negligible.

While I have shown and described my invention as utilized in controlling a single motor, it is evident that it may be employed to control a plurality of motors which are connected either in series or in parallel relation to each other and that it may be employed to control any type of alternating-current motor or any other suitable translating device or devices. It will be understood, therefore, that the claims are to be so construed as to cover either a single translating device or a plurality of such devices, according to the service conditions that may prevail, and that the kind or type of such devices may be such as the given conditions of service may require.

I claim as my invention—

1. The combination with a source of alternating-current energy and a transformer-winding connected thereto, of a suitable translating device having a terminal connected to said winding, an ohmic resistance and an inductive resistance connected in parallel with each other and having their middle points connected together and to the other terminal of said translating device or devices, and means for connecting the terminals of the said ohmic and inductive resistances to different points in the transformer-winding.

2. The combination with a source of alternating-current energy and a transformer-winding connected thereto, of a suitable translating device having a terminal connected to said winding, an ohmic resistance and an inductive resistance connected in parallel with each other and having their middle points connected together and to the other terminal of said translating device or devices, and means for connecting the terminals of the said ohmic and inductive resistances to different points in the transformer-winding and for reversing the direction of the drop of potential over said ohmic and inductive resistances with each change in the voltage.

3. The combination with a source of alternating-current energy and a transformer-winding connected thereto, of a suitable translating device having a terminal connected to said winding, an ohmic resistance and an inductive resistance connected in parallel with each other and having points intermediate their terminals connected together and to the other terminal of said translating device, and means for connecting the terminals of the said ohmic and inductive resistances to different points in the transformer-winding.

4. The combination with a source of electrical energy of different voltages and a translating device supplied therefrom, of an ohmic resistance and an inductive resistance connected in parallel with each other and having their middle points connected together and to a terminal of said translating device, and means for connecting the terminals of the ohmic and inductive resistances to points which are supplied from said source and which differ in potential.

5. The combination with a source of electrical energy of different voltages and a translating device supplied therefrom, of an ohmic resistance and an inductive resistance connected in parallel with each other and having their middle points connected together and to a terminal of said translating device, and means for connecting the terminals of the ohmic and inductive resistances to points which are supplied from said source and which differ in potential and for reversing the direction of the drop of potential over the said ohmic and inductive resistances with each variation in the voltage.

6. The combination with a source of electrical energy of different voltages and a translating device supplied therefrom, of an ohmic resistance and an inductive resistance connected in parallel with each other and having points intermediate their terminals connected together and to a terminal of said translating device, and means for connecting the terminals of the ohmic and inductive resistances to points which are supplied from said source and which differ in potential.

7. The combination with a source of alternating-current energy and a transformer-winding connected thereto, of a suitable translating device having a terminal connected to said winding, two regulating-windings connected in parallel with each other and having their middle points connected together and to the other terminal of said translating device or devices, and means for connecting the terminals of the regulating-windings to different points in the transformer-winding.

8. The combination with a source of alternating-current energy and a transformer-winding connected thereto, of a suitable translating device having a terminal connected to said winding, two regulating-windings connected in parallel with each other and having their middle points connected together and to the other terminal of said translating device or devices, and means for connecting the terminals of the said regulating-windings to different points in the transformer-winding and for reversing the direction of the drop of potential over said regulating-windings with each change in the voltage.

9. The combination with a source of alternating-current energy and a transformer-winding connected thereto, of a suitable translating device having a terminal connected to said winding, two regulating-windings connected in parallel with each other and having points intermediate their terminals connected together and to the other terminal of said translating device, and means for connecting the terminals of the said regulating-windings to different points in the transformer-winding.

10. The combination with a source of variable-voltage electrical energy and a translating device supplied therefrom, of two regulating-windings connected in parallel with each other and having their middle points connected together and to a terminal of said translating device, and means for connecting the terminals of the regulating-windings to points which are supplied from said source and which differ in potential.

11. The combination with a source of variable-voltage electrical energy and a translating device supplied therefrom, of two regulating-windings connected in parallel with each other and having their middle points connected together and to a terminal of said translating device, and means for connecting the terminals of the regulating-windings to points which are supplied from said source and which differ in potential and for reversing the direction of the drop of potential over the said regulating-windings with each variation in voltage.

12. The combination with a source of variable-voltage electrical energy and a translating device supplied therefrom, of two regulating-windings connected in parallel with each other and having points intermediate their terminals connected together and to a terminal of said translating device, and means for connecting the terminals of the regulating-windings to points which are supplied from said source and which differ in potential.

13. The combination with a source of variable-voltage electrical energy and a translating device supplied therefrom, of a regulating-winding having its middle point connected to one terminal of said translating device and means for connecting the terminals of the regulating-winding to points which are supplied from said source and which differ in potential.

14. The combination with a source of variable-voltage electrical energy and a translating device supplied therefrom, of a regulating-winding having its middle point connected to one terminal of said translating device and means for connecting the terminals of the regulating-winding to points which are supplied from said source and which differ in potential and for reversing the direction of the drop of potential over the said regulating-winding with each variation in voltage.

15. The combination with a source of variable-voltage electrical energy and a translating device supplied therefrom, of a regulating-winding having a point intermediate its terminals connected to one terminal of said translating device, and means for connecting the terminals of the regulating-winding to points which are supplied from said source and which differ in potential.

16. The combination with a source of alternating-current energy and a transformer-winding connected thereto, of a suitable translating device having a terminal connected to said winding, two regulating resistance devices connected in parallel with each other and having points intermediate their terminals connected together and to the other terminal of said translating device, and means for connecting the terminals of the said regulating resistance devices to different points in the transformer-winding.

17. The combination with a source of variable-voltage electrical energy and a translating device supplied therefrom, of two regulating devices connected in parallel with each other and having their middle points connected together and to a terminal of said translating device, and means for connecting the terminals of the regulating devices to points which are supplied from said source and which differ in potential.

18. The combination with a source of variable-voltage electrical energy and a translating device supplied therefrom, of a regulating resistance having its middle point connected to one terminal of said translating device and means for connecting the terminals of the regulating resistance to points which are supplied from said source and which differ in potential.

19. The combination with a source of variable-voltage electrical energy and a translating device supplied therefrom, of a regulating resistance having its middle point connected to one terminal of said translating device and means for connecting the terminals of the regulating resistance to points which are supplied from said source and which differ in potential and for reversing the direction of the drop of potential over the said regulating resistance with each variation in voltage.

20. The combination with a source of variable-voltage electrical energy and a translating device supplied therefrom, of a regulating resistance having a point intermediate its terminals connected to one terminal of said translating device, and means for connecting the terminals of the regulating resistance to points which are supplied from said source and which differ in potential.

21. The combination with a source of variable-voltage electrical energy and a translating device supplied therefrom, of a regulating-winding having its middle point connected to one terminal of said translating device and means for connecting each terminal of the regulating-winding to different-voltage terminals that lead from said source.

22. The combination with a source of variable-voltage electrical energy and a translating device supplied therefrom, of a regulating-winding having a point intermediate its terminals connected to one terminal of said translating device, and means for connecting each terminal of the regulating-winding to different-voltage terminals that lead from said source.

23. The combination with a source of variable-voltage electrical energy and a translating device supplied therefrom, of a regulating resistance having its middle point connected to one terminal of said translating device and means for connecting each terminal of the regulating resistance to different-voltage terminals that lead from said source.

24. The combination with a source of variable-voltage electrical energy and a translating device supplied therefrom, of a regulating resistance having a point intermediate its terminals connected to one terminal of said translating device, and means for connecting each terminal of the regulating resistance to different-voltage terminals that lead from said source.

25. The combination with a source of variable-voltage electrical energy and an electric motor supplied therefrom, of a regulating resistance, approximately the middle point of which is connected to one of the motor-terminals, and means for connecting each of the resistance-terminals to different-voltage terminals that lead from said source.

In testimony whereof I have hereunto subscribed my name this 20th day of January, 1905.

RAY P. JACKSON.

Witnesses:
  F. E. WYNNE,
  BIRNEY HINES.